US012806703B2

(12) United States Patent
Kheradmand et al.

(10) Patent No.: US 12,806,703 B2
(45) Date of Patent: Nov. 24, 2026

(54) SYSTEM AND METHOD FOR AUTOMATICALLY ADJUSTING WELDING VARIABLES OF A ROBOTIC WELDING SYSTEM

(71) Applicant: Novarc Technologies Inc., North Vancouver (CA)

(72) Inventors: Shakiba Kheradmand, North Vancouver (CA); Ringo Gonzalez, North Vancouver (CA); Roger Balakrishnan, North Vancouver (CA); Ahmad Ashoori, Vancouver (CA); Soroush Karimzadeh, North Vancouver (CA)

(73) Assignee: Novarc Technologies Inc., Burnaby (CA)

(*) Notice: Subject to any disclaimer, the term of this patent is extended or adjusted under 35 U.S.C. 154(b) by 604 days.

(21) Appl. No.: 18/255,461

(22) PCT Filed: Dec. 16, 2021

(86) PCT No.: PCT/CA2021/051822
§ 371 (c)(1),
(2) Date: Jun. 1, 2023

(87) PCT Pub. No.: WO2022/126274
PCT Pub. Date: Jun. 23, 2022

(65) Prior Publication Data

US 2024/0100614 A1 Mar. 28, 2024

Related U.S. Application Data

(60) Provisional application No. 63/127,137, filed on Dec. 17, 2020.

(51) Int. Cl.
*B23K 9/095* (2006.01)
*B23K 9/028* (2006.01)
(Continued)

(52) U.S. Cl.
CPC .......... *B23K 9/0956* (2013.01); *B23K 9/0282* (2013.01); *B23K 37/0229* (2013.01);
(Continued)

(58) Field of Classification Search
CPC ................ B23K 9/0956; B23K 9/0282; B23K 37/0229; B23K 2101/10; B23K 9/007;
(Continued)

(56) References Cited

U.S. PATENT DOCUMENTS 4,733,051 A 3/1988 Nadeau et al.
5,959,425 A 9/1999 Bieman et al.
(Continued)

FOREIGN PATENT DOCUMENTS

CA 3088280 A1 8/2019
CM 111275659 A * 6/2020 ........... G06T 7/0004
(Continued)

OTHER PUBLICATIONS

Deng, Jing-yu; English translation of CN-111275659-A, published Jun. 2020 (Year: 2020).*
(Continued)

*Primary Examiner* — Jonathan Michael Skrzycki

(57) ABSTRACT

Disclosed is a system having a robotic welding system, a controller, a camera, and a processor. The robotic welding system is configured to weld metal sections together in accordance with a plurality of welding variables. The controller is configured to automatically control the robotic welding system. The camera captures sequential images of the welding performed by the robotic welding system. According to an embodiment, the processor is configured to process the sequential images to determine when a selected welding state is to change to a next welding state based on the selected welding state and multiple consistent determinations of the next welding state, and to signal that change
(Continued)

to the controller to effect a change in how the welding is performed by the robotic welding system. By considering multiple consistent determinations of the next welding state, there can be a high probability that the next welding state is correct.

25 Claims, 8 Drawing Sheets

(51) Int. Cl.
*B23K 37/02* (2006.01)
*G05B 19/4155* (2006.01)
*G06T 7/00* (2017.01)
*B23K 101/10* (2006.01)

(52) U.S. Cl.
CPC ........ *G05B 19/4155* (2013.01); *G06T 7/0004* (2013.01); *B23K 2101/10* (2018.08); *G05B 2219/45104* (2013.01); *G06T 2207/10016* (2013.01); *G06T 2207/20072* (2013.01); *G06T 2207/30136* (2013.01)

(58) Field of Classification Search
CPC .. B23K 9/0216; B23K 9/0953; B23K 31/006; G05B 19/4155; G05B 2219/45104; G05B 2219/40609; G06T 7/0004; G06T 2207/10016; G06T 2207/20072; G06T 2207/30136; B25J 9/1697
See application file for complete search history.

(56) References Cited

U.S. PATENT DOCUMENTS

| | | | | |
|---|---|---|---|---|
| 6,049,059 | A | 4/2000 | Kim | |
| 10,661,396 | B2 | 5/2020 | Abdollahi et al. | |
| 2013/0119040 | A1 | 5/2013 | Suraba et al. | |
| 2016/0175964 | A1* | 6/2016 | Penoyer | B23K 9/0956 219/137 R |
| 2018/0350055 | A1* | 12/2018 | Cardenas Bernal | G06F 30/15 |
| 2021/0318673 | A1* | 10/2021 | Kitchen | B23K 31/006 |
| 2022/0067914 | A1* | 3/2022 | Oelscher | G06T 7/0004 |
| 2023/0377155 | A1* | 11/2023 | Raharja | G06T 7/0012 |
| 2024/0025041 | A1* | 1/2024 | Lonsberry | B23K 37/0258 |

FOREIGN PATENT DOCUMENTS

| | | | | |
|---|---|---|---|---|
| CN | 111390351 | A | 7/2020 | |
| CN | 111882557 | A * | 11/2020 | G06N 3/045 |
| WO | WO 2017/165964 | A1 | 10/2017 | |
| WO | WO-2019153090 | A1 * | 8/2019 | B25J 9/1684 |

OTHER PUBLICATIONS

Teng, Yu-tong; English translation of CN-111882557-A, published Nov. 2020 (Year: 2020).*
Sharkey, Katie, et al., "Histogram-based Thresholding", Jan. 27, 2012, 8 pages.
International Search Report and Written Opinion of corresponding International Application No. PCT/CA2021/051822 dated Apr. 4, 2022, 9 pages.
Bae, K.-Y., et al. (2002), "An optical sensing system for seam tracking and weld pool control in gas metal arc welding of steel pipe", Journal of Materials Processing Technology, 458-465, 2002.
Ma, Hongbo et al., Robot welding seam tracking method based on passive vision for thin plate closed-gap butt welding, The International Journal of Advanced Manufacturing Technology 48, 945-953, 2010.
Nele, L. et al., An image acquisition system for real-time seam tracking, The International Journal of Advanced Manufacturing Technology 69, 2099-2110, 2013.
Shen, H-y et al., Arc welding robot system with seam tracking and weld pool control based on passive vision, The International Journal of Advanced Manufacturing Technology 39, 669-678, 2008.
Tecnar Automation Ltd., Rotoweld 3.0 brochure (http://www.tecnar.com/wp-content/themes/tecnar-oz/pdf/rotoweld_brochure.pdf).
Tecnar Automation Ltd., Rotoweld 3.0 user manual (http://www.tecnar.com/wp-content/themes/tecnar-oz/pdf/rotoweld_manual.pdf).

* cited by examiner

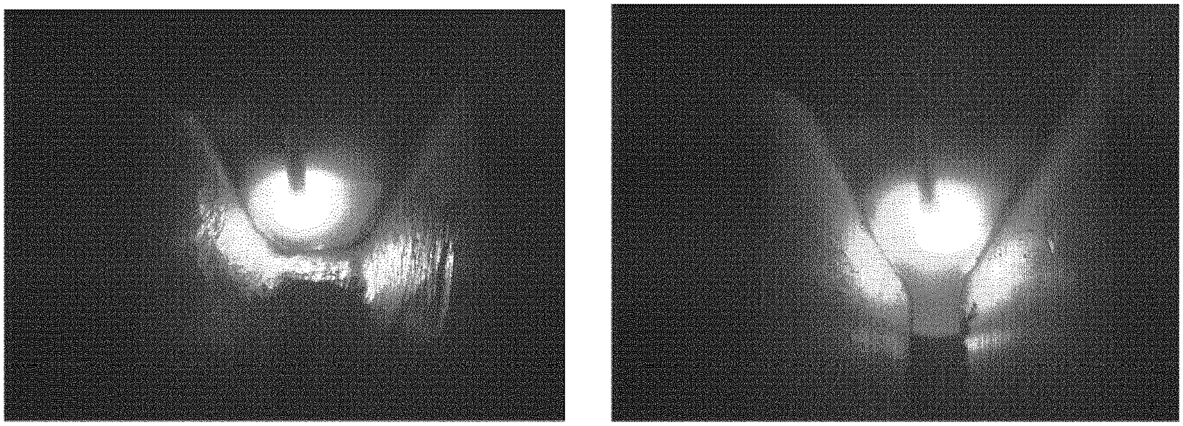
FIG. 7A
FIG. 7B
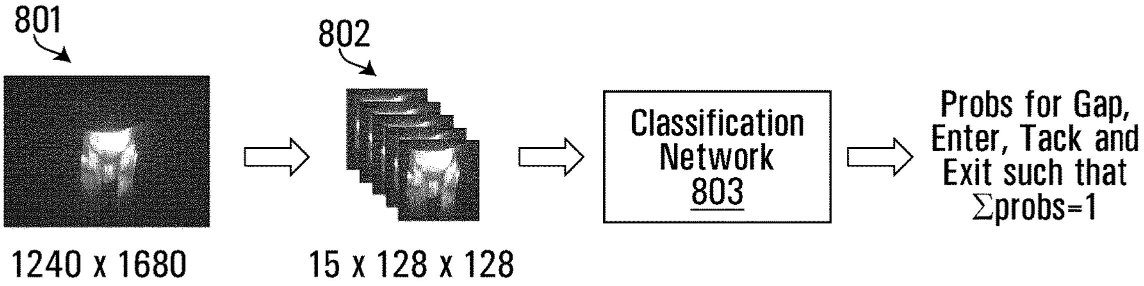
FIG. 8
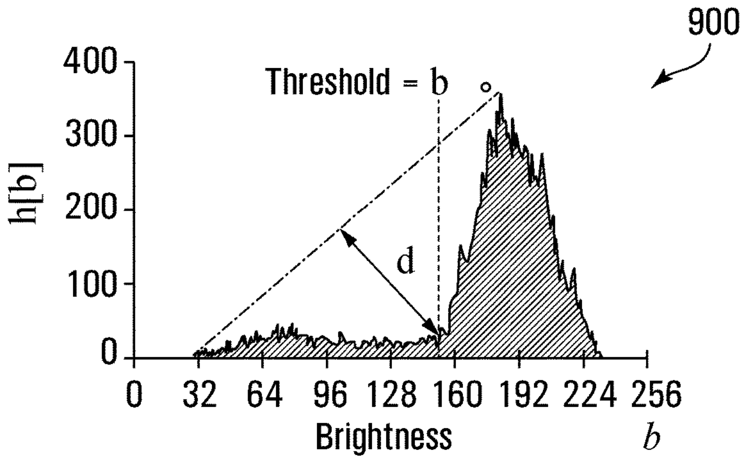
FIG. 9

SYSTEM AND METHOD FOR AUTOMATICALLY ADJUSTING WELDING VARIABLES OF A ROBOTIC WELDING SYSTEM

CROSS-REFERENCE TO RELATED APPLICATIONS

This patent application is the U.S. national stage of International Application No. PCT/CA2021/051822 filed on Dec. 16, 2021, which in turn claims the benefit of priority of U.S. Provisional Patent Application No. 63/127,137 filed on Dec. 17, 2020. Both International Application No. PCT/CA2021/051822 and U.S. Provisional Patent Application No. 63/127,137 are hereby incorporated herein by reference in their entirety.

FIELD OF THE DISCLOSURE

This disclosure relates to welding systems, and more particularly to robotic welding systems that perform automatic welding.

BACKGROUND

Robotic welding systems that perform automatic welding are known in the art. See for example PCT publication WO 2019/153090, which discloses a method for controlling a robotic welding system to weld pipe sections together. In that disclosure, the pipe sections are held in fixed relation to each other by a plurality of stitches at a seam between the pipe sections, and the robotic welding system operates to weld the pipe sections together.

Robotic welding systems can perform welding automatically in accordance with a set of welding variables. The set of welding variables can for example include WFS (wire feed speed), UltimArc™, trim, amplitude, frequency, speed and/or dwell. However, in some situations, values used for the set of welding variables could be inappropriate. In general, for any given welding scenario, there can be difficulties in determining the values for the set of welding variables to be utilized by the robotic welding system. Moreover, even if the values are appropriate under a first welding scenario (e.g. while welding in a gap), they could become inappropriate upon entering a second welding scenario (e.g. while welding over a stitch).

It is desirable to provide a system and a method for automatically adjusting values of the welding variables of a robotic welding system while the robotic welding system is welding, such that there is a high probability of the values being appropriate during any given welding scenario.

SUMMARY OF THE DISCLOSURE

Disclosed is a system having a robotic welding system, a controller, a camera, and a processor. The robotic welding system is configured to weld metal sections together in accordance with a plurality of welding variables. The controller is configured to automatically control the robotic welding system in accordance with a selected welding state of a plurality of possible welding states, wherein the possible welding states differ from one another in terms of values for the welding variables which are defined for each possible welding state. The camera is positioned to capture sequential images of the welding performed by the robotic welding system.

In accordance with an embodiment of the disclosure, the processor is configured to process the sequential images to determine when the selected welding state is to change to a next welding state of the possible welding states based on the selected welding state and multiple consistent determinations of the next welding state, and to signal that change to the controller to effect a change in how the welding is performed by the robotic welding system. By considering multiple consistent determinations of the next welding state, there can be a high probability that the next welding state is correct. This can avoid a situation in which a wrong welding state is selected.

In some implementations, the metal sections have been stitched together with stitches in preparation for the welding, and the processor is configured to determine the next welding state based on stitching between the metal sections in a region being welded.

Also disclosed is a method that involves automatically controlling a robotic welding system to weld metal sections together in accordance with a selected welding state of a plurality of possible welding states. The possible welding states differ from one another in terms of values for welding variables which are defined for each possible welding state. The method also involves receiving sequential images of the welding, and processing the sequential images to determine when the selected welding state is to change to a next welding state of the possible welding states.

In accordance with an embodiment of the disclosure, the determination of when the selected welding state is to change to a next welding state is based on the selected welding state and multiple consistent determinations of the next welding state. The method also involves, when the selected welding state is to change to the next welding state, automatically changing to the next welding state for the selected welding state to effect a change in how the welding is performed by the robotic welding system. By considering multiple consistent determinations of the next welding state, there can be a high probability that the next welding state is correct. This can avoid a situation in which a wrong welding state is selected.

Also disclosed is a non-transitory computer readable medium having recorded thereon statements and instructions that, when executed by control circuitry, implement a method as described herein.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which:

FIGS. 7A and 7B are photographs of example frames captured by the system of FIG. 2;

FIG. 8 is a schematic showing pre-processing and processing of a set of frames to determine a probable welding state;

FIG. 9 is a graph showing application of a histogram triangle algorithm for the pre-processing;

DETAILED DESCRIPTION OF EMBODIMENTS

It should be understood at the outset that although illustrative implementations of one or more embodiments of the present disclosure are provided below, the disclosed systems and/or methods may be implemented using any number of techniques. The disclosure should in no way be limited to the illustrative implementations, drawings, and techniques illustrated below, including the exemplary designs and implementations illustrated and described herein, but may be modified within the scope of the appended claims along with their full scope of equivalents.

Introduction & System

Figure 1:
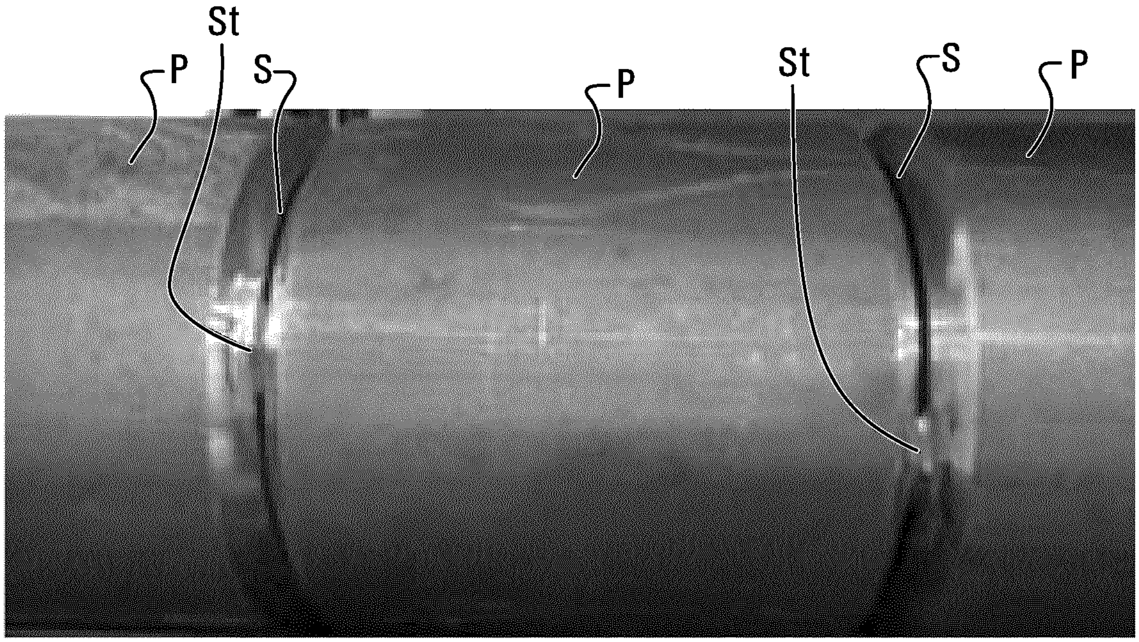
FIG. 1 is a photograph of pipe sections stitched together with stitches in preparation for welding.

Referring first to FIG. 1, shown is a photograph of pipe sections P stitched together with stitches St in preparation for welding. A seam S is located at an interface between each pair of adjacent pipe sections P, and the stitches St are located around each seam S to hold the pipe sections P together to form a pipe string. For example, each seam S may have three stitches St spaced about a circumference of the pipe sections P. The three stitches St can be evenly spaced (e.g. separated by about 120 degrees), or unevenly spaced. More or less than three stitches St can be used for each seam S depending on a diameter and a wall thickness of the pipe sections P.

Figure 2:
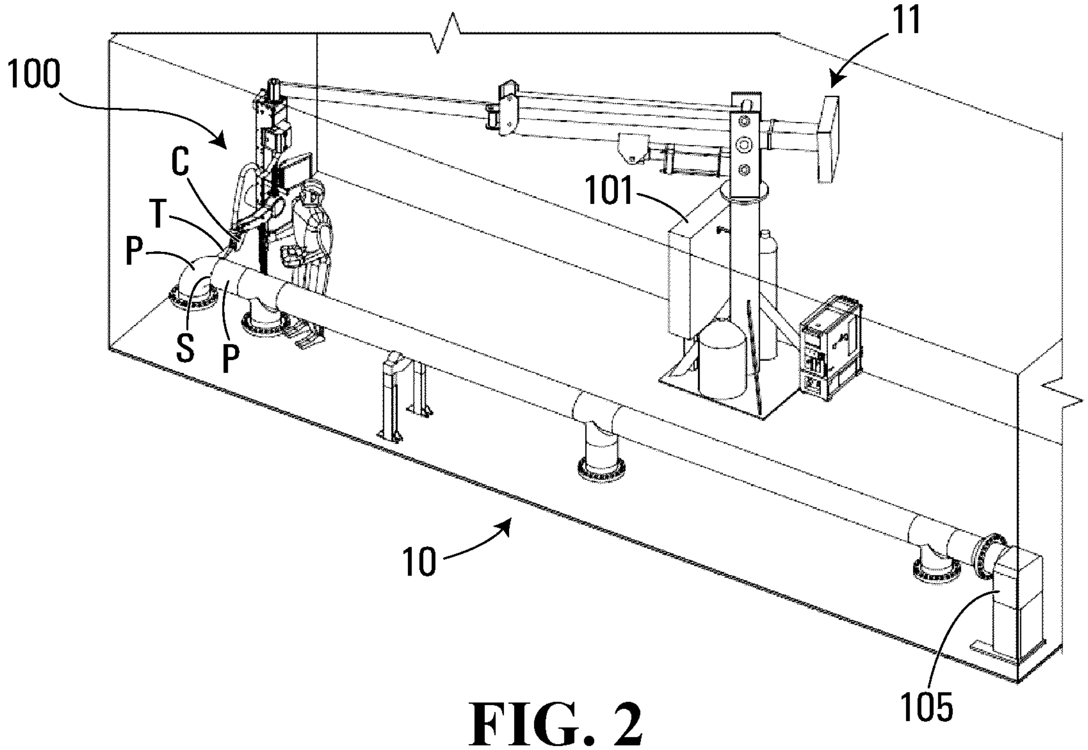
FIG. 2 is a schematic of an example system for performing an automatic pipe welding operation according to one embodiment.

Referring now to FIG. 2, shown is an example system 10 for performing an automatic pipe welding operation according to one embodiment. The system 10 includes a robotic welding system 100, which has a welding torch T for performing welding, and a camera C for capturing frames of the welding. In some implementations, the system 10 also includes a repositionable support structure 11 that facilitates positioning of the welding torch T at a seam S to be welded. In some implementations, the system 10 also includes a positioner 105, which rotates the pipe sections P in relation to the robotic welding system 100 mounted on the repositionable support structure 11. In some implementations, the system 10 also includes a control cabinet 101, which is operably connected to the robotic welding system 100 and the camera C, as described below.

Figure 3:
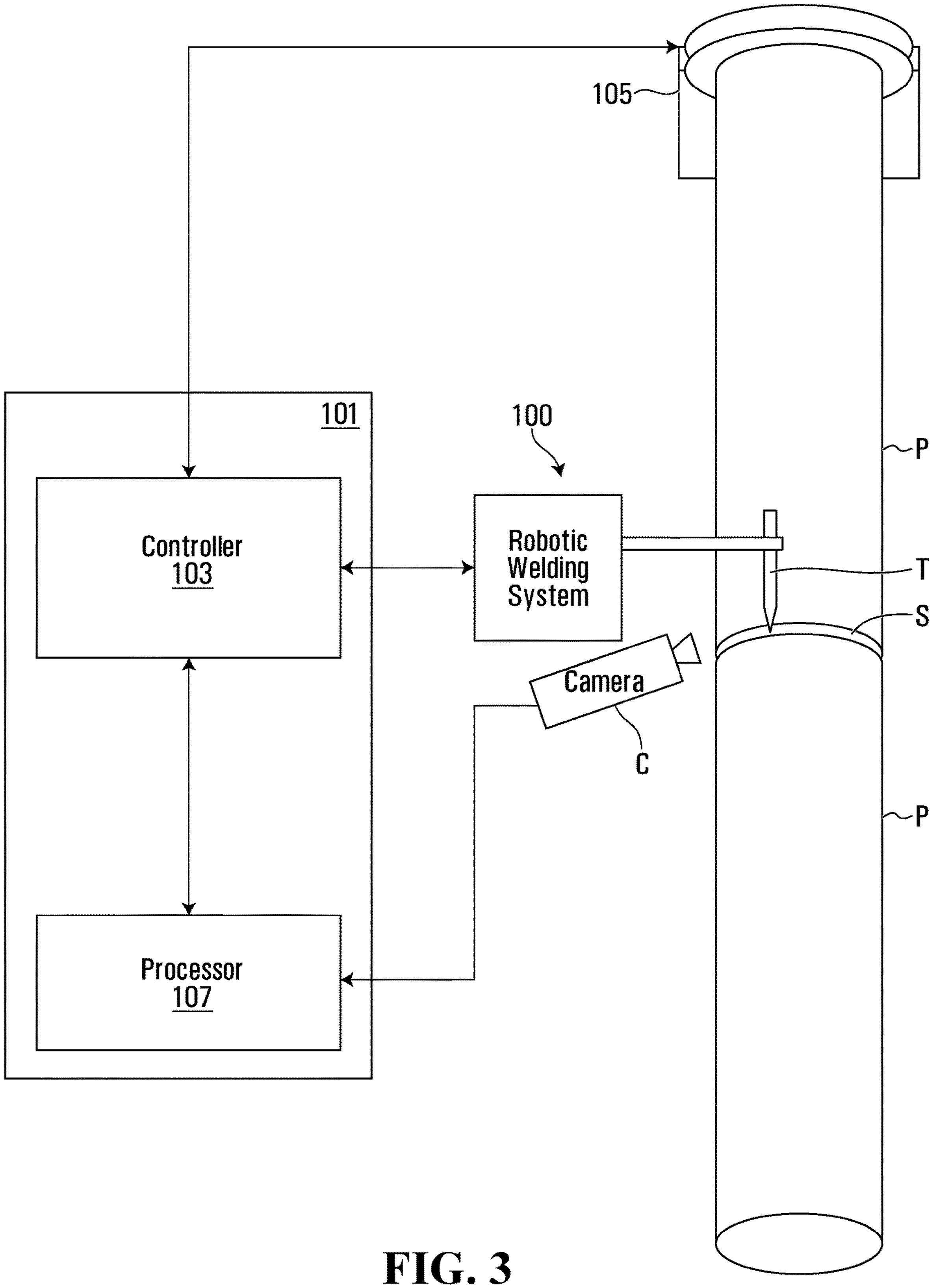
FIG. 3 is a block diagram of the system shown in FIG. 2.

Referring now to FIG. 3, shown is a block diagram of the system 10 shown in FIG. 2. In some implementations, the control cabinet 101 houses a controller 103, which controls the robotic welding system 100 to execute a welding pattern and controls the positioner 105 to rotate the pipe sections P. In some implementations, the control cabinet 101 also houses a processor 107 connected to the camera C and the controller 103. As described below, the processor 107 is configured to process images from the camera C and to provide the controller 103 with signals based on the processed images for the controller to control the operation of the robotic welding system 100.

The robotic welding system 100 is configured to weld the metal sections P together in accordance with a plurality of welding variables. The controller 103 is configured to automatically control the robotic welding system 100 in accordance with a selected welding state of a plurality of possible welding states. The possible welding states differ from one another in terms of values for the welding variables, which are defined for each possible welding state. The camera C is positioned to capture sequential images of the welding performed by the robotic welding system 100.

In accordance with an embodiment of the disclosure, the processor 107 is configured to process the sequential images from the camera C to determine when the selected welding state is to change to a next welding state of the possible welding states based on the selected welding state and multiple consistent determinations of the next welding state, and to signal that change to the controller 103 to effect a change in how the welding is performed by the robotic welding system 100. By considering multiple consistent determinations of the next welding state, there can be a high probability that the next welding state is correct. This can avoid a situation in which a wrong welding state is selected.

In some implementations, the metal sections P have been stitched together with stitches St in preparation for the welding (see for example FIG. 1), and the processor 107 is configured to determine the next welding state based on stitching between the metal sections in a region being welded. For these implementations, the manner in which the welding is performed by the robotic welding system 100 is dependent on stitching between the metal sections in a region being welded. In particular, by changing to the next welding state, the values for the welding variables used by the robotic welding system 100 are adjusted.

Although the illustrated example shows the metal sections P as pipe sections P that have been stitched together with stitches St to form a pipe string, it is to be understood that other metal sections of varying shapes and sizes can be welded together. The disclosure is not limited to welding pipe sections P. Other metal sections such as flat metal sections can be welded together, for example. For such other implementations, there might be no positioner 105. Other mechanisms are possible for manipulating the metal sections P to be welded. Alternatively, the metal sections P are not manipulated at all, and the robotic welding system 100 performs all of movement for the welding.

There are many possibilities for the controller 103 and the processor 107. In some implementations, the controller 103 includes a PLC (programmable logic controller). In some implementations, the processor includes a CPU (central processing unit), an IPC (industrial PC) and/or a GPU (graphics processing unit) using CUDA (Compute Unified Device Architecture) or other parallel computing platform. Other implementations can include additional or alternative hardware components, such as any appropriately configured FPGA (Field-Programmable Gate Array), ASIC (Application-Specific Integrated Circuit), and/or processor, for example. More generally, the system 10 can be controlled with any suitable control circuitry. The control circuitry can include any suitable combination of hardware, software and/or firmware.

Details of an example implementation for the robotic welding system 100 can be found in PCT patent application publication no. WO 2019/153090 and PCT patent application publication no. WO 2017/165964, which are hereby incorporated by reference. Other implementations for the robotic welding system 100 are possible and are within the scope of the disclosure. Further details of the system 10 are provided below.

Example Welding States

As described above with reference to FIGS. 2 and 3, the controller 103 is configured to automatically control the robotic welding system 100 in accordance with a selected welding state of a plurality of possible welding states. Example welding states and transitions between the same will now be described below with reference to FIGS. 4 to 6. It is to be understood at the outset that the example implementations described below are very specific and are provided merely as examples. Other implementations are possible and are within the scope of the disclosure.

Figure 4:
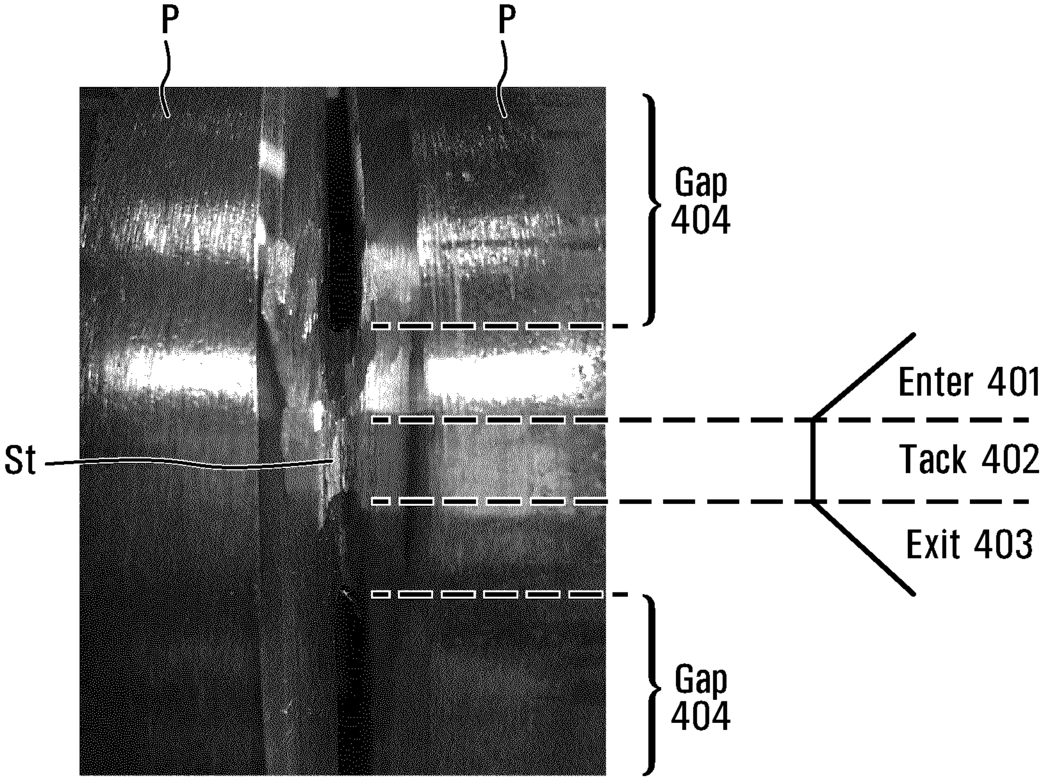
FIG. 4 is a photograph of a stitch stitching together two pipe sections to be welded.

Referring first to FIG. 4, shown is a photograph of a stitch St stitching together two pipe sections P to be welded. Three regions of the stitch St have been labelled: an enter region 401, a tack region 402, and an exit region 403. The tack region 402 is where the stitch St is located. The enter region 401 and the exit region 403 are where the stitch St leads to a gap between the two pipe sections P. These regions can be partially filled by the stitch St, such that there may be no gap, but generally they are not filled as much as the tack region 402. In addition, a gap region 404 is where there is a visible gap between the two pipe sections P with no stitch St. Thus, in total, there are four distinct regions 401-404.

The manner in which welding is performed by the robotic welding system 100 depends on the region being welded. In particular, values for the welding variables utilized by the robotic welding system 100 depend on the region being welded. Therefore, four welding states are defined to correspond with the four distinct regions 401-404. The four welding states include a gap state 504 for welding the metal sections P together in the gap region 404 (i.e. a gap with no stitch), an enter state 501 for welding the metal sections P together in the enter region 401 (i.e. a gap leading to a stitch), a tack state 502 for welding the metal sections P together in the tack region 402 (i.e. a stitch and no gap), and an exit state 503 for welding the metal sections P together in the exit region 403 (i.e. a stitch leading to a gap). These four welding states 501-504 differ from one another in terms of values for the welding variables which are defined for each welding state.

There are many ways that the values for the welding variables can be defined for each welding state. In some implementations, the values are predefined in advance for each welding state. In other implementations, for each welding state, the values are a function of duration in the welding state and/or based some other input from another part of the system 10 (e.g. width of a stitch) such that the processor 107 can determine the values. Some criteria such as thickness of a pipe being welded, for example, could be considered in determining the values for the welding variables. Other implementations are possible.

In some implementations, the processor 107 determines a probable welding state of the plurality of possible welding states based on a set of images of the sequential images, and repeats the determining of the probable welding state for subsequent sets of images of the sequential images. Each set of images can for example include fifteen consecutive images (e.g. images 1-15 for first set, images 2-16 for second set, images 3-17 for third set, etc.), although other implementations are possible. Furthermore, upon determining a same welding state as the probable welding state a defined number of consecutive times, if the probable welding state is not equal to a current welding state, then the processor 107 determines that the current welding state is to change to the probable welding state as the next welding state. By considering multiple consistent determinations of the next welding state, there can be a high probability that the next welding state is correct. A specific example is provided below to illustrate this concept.

Figure 5:
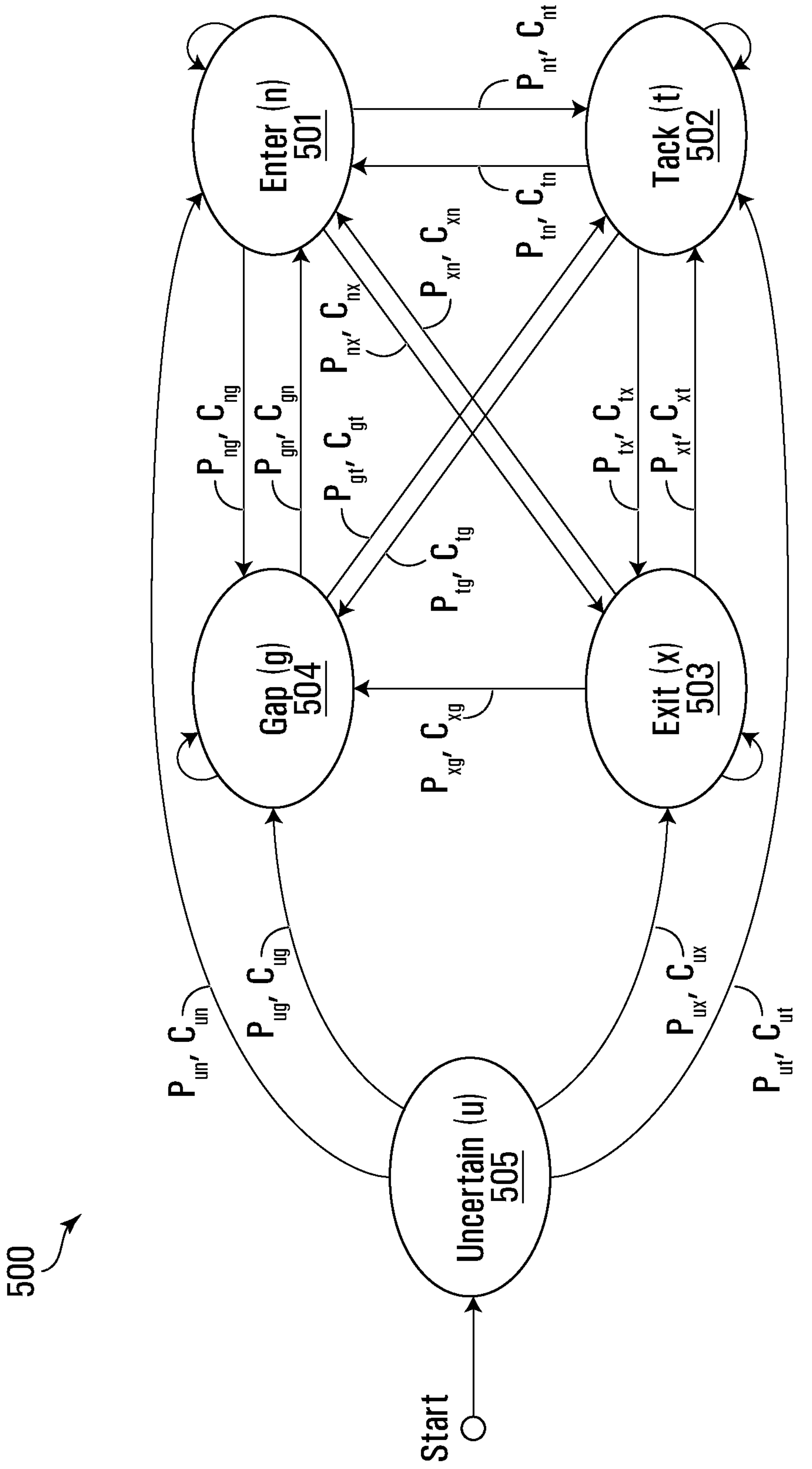
FIG. 5 is a state diagram showing possible welding states and state transitions between the same.

Referring now to FIG. 5, shown is a state diagram 500 showing possible welding states 501-504 and state transitions between the same. For each state transition to a target welding state, two numbers are indicated: (1) a minimum probability P to deem the target welding state as a probable welding state for the next welding state based on a single set of frames of the sequential images, and (2) a number of consecutive times C that the target welding state is deemed to be the probable welding state for consecutive sets of frames of the sequential images. In some implementations, both of these two numbers are considered when determining state transitions.

In some implementations, for each state transition to a target welding state, the minimum probability P and the number of consecutive times C are predefined in advance. An example set of values is listed below.

| Variables | Example Values |
|---|---|
| $P_{un}$, $C_{un}$ | 0.9, 5 |
| $P_{ug}$, $C_{ug}$ | 0.8, 5 |
| $P_{ut}$, $C_{ut}$ | 0.9, 5 |
| $P_{ux}$, $C_{ux}$ | 0.9, 5 |
| $P_{xg}$, $C_{xg}$ | 0.95, 5 |
| $P_{ng}$, $C_{ng}$ | 0.95, 10 |
| $P_{gn}$, $C_{gn}$ | 0.99, 40 |
| $P_{nt}$, $C_{nt}$ | 0.95, 5 |
| $P_{tn}$, $C_{tn}$ | 0.99, 40 |
| $P_{xt}$, $C_{xt}$ | 0.95, 40 |
| $P_{tx}$, $C_{tx}$ | 0.95, 5 |
| $P_{nx}$, $C_{nx}$ | 0.95, 20 |
| $P_{xn}$, $C_{xn}$ | 0.99, 50 |
| $P_{gt}$, $C_{gt}$ | 0.95, 30 |
| $P_{tg}$, $C_{tg}$ | 0.95, 10 |

It is to be understood that, for each state transition, the two numbers are implementation-specific such that other values/quantities are possible. More generally, each minimum probability P can be set to any appropriate number in a range between zero and one (i.e. $0<P\leq 1$), and each number of consecutive times C can be set to any appropriate whole number (i.e. $C>0$).

In the illustrated example, the state transitions can go through the four welding states 501-504 in a clockwise pattern, starting from any of the four welding states 501-504. For example, starting in the gap state 504, if the enter state 501 is calculated to be a probable welding state (e.g. at least 95% probability) for each of multiple consecutive sets of frames (e.g. ten consecutive sets of frames) of the sequential images, then the enter state 501 is determined to be the next welding state. Then, while in the enter state 501, if the tack state 502 is calculated to be a probable welding state (e.g. at least 95% probability) for each of multiple consecutive sets of frames (e.g. five consecutive sets of frames) of the sequential images, then the tack state 502 is determined to be the next welding state. Then, while in the tack state 502, if the exit state 503 is calculated to be a probable welding state (e.g. at least 95% probability) for each of multiple consecutive sets of frames (e.g. five consecutive sets of frames) of the sequential images, then the exit state 503 is determined to be the next welding state. Then, while in the exit state 503, if the gap state 504 is calculated to be a probable welding state (e.g. at least 95% probability) for each of multiple consecutive sets of frames (e.g. five consecutive sets of frames) of the sequential images, then the gap state 504 is determined to be the next welding state. Additional clockwise cycles through the state diagram 500 are possible until a welding operation is completed. Meanwhile, each state transition is signalled to the controller 103 to effect a change in how the welding is performed by the robotic welding system 100.

It is noted that the state diagram 500 is almost fully connected in terms of state transitions, including state transitions that would not be expected under normal operation. For example, the state diagram 500 includes a state transition from the gap state 504 to the tack state 502. This state transition would not be expected under normal operation because the enter state 501 should normally follow the gap state 504. However, including this state transition can help in erroneous situations, such as when the enter state 501 has been incorrectly skipped due to an error in processing. Given that this state transition is not expected under normal operation, there is a relatively high threshold for the state transition. In particular, while in the gap state 504, if the tack state 502 is calculated to be a probable welding state (e.g. at least 95% probability) for each of multiple consecutive sets of frames (e.g. thirty consecutive sets of frames) of the sequential images, then the tack state 502 is determined to be the next welding state. By considering thirty consecutive sets of frames (instead of five or ten consecutive sets of frames for example), there is a relatively high threshold for the state transition.

It is also noted that the currently selected state matters when determining the next welding state. For instance, a state transition from the gap state 504 to the tack state 502 has a different threshold compared to a state transition from the enter state 501 to the tack state 502. As noted above, the state transition from the gap state 504 to the tack state 502 would not be expected under normal operation and hence has a relatively high threshold. By contrast, the state transition from the enter state 501 to the tack state 502 would be expected under normal operation and hence has a lower threshold.

In some implementations, the controller 103 begins in an initial uncertain state 505 before the processor 107 determines a first welding state. Thus, the state diagram 500 includes the initial uncertain state 505 as a starting point before transitioning to one of the four welding states 501-504. For each of the possible welding states 501-504, a number of consecutive times to determine the possible welding state 501-504 as a probable welding state is defined as a threshold for determining the possible welding state 501-504 as the first welding state. For example, while in the initial uncertain state 505, if the gap state 504 is calculated to be a probable welding state (e.g. at least 90% probability) for each of multiple consecutive sets of frames (e.g. five consecutive sets of frames) of the sequential images, then the gap state 504 is determined to be the first welding state. The processor 107 would signal this information to the controller 103 so that the welding by the robotic welding system 100 is performed in accordance with the gap state 504.

In some implementations, the initial uncertain state 505 is a welding state, meaning that welding is performed by the robotic welding system 100 while in the initial uncertain state 505. In this regard, the state diagram 500 of FIG. 5 can be considered to have five welding states 501-505 in total, including the four welding states 501-504 described above and the initial uncertain state 505. In other implementations, the initial uncertain state 505 is not a welding state, meaning that no welding is performed by the robotic welding system 100 while in the initial uncertain state 505. Also, although the illustrated example does not show any state transitions into the initial uncertain state 505, in other implementations there are state transitions into the initial uncertain state 505 from one or more of the four welding states 501-504.

Whilst the state diagram 500 of FIG. 5 is specific to the four welding states 501-504 described above with reference to FIG. 4, it is noted that other state diagrams are possible. Also, other sets of welding states are possible. The disclosure is not limited to the four welding states 501-504 described above with reference to FIGS. 4 and 5. For example, in another implementation, only two welding states are defined: a first welding state for welding metal sections together in a region having a gap, and a second welding state for welding metal sections together in a region having a stitch. Other implementations are possible.

Figure 6A:
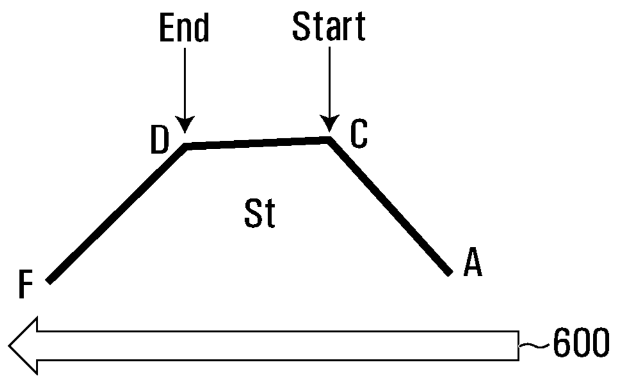
FIGS. 6A to 6C are schematics showing different possible timings for tack fusion.
Figure 6B:
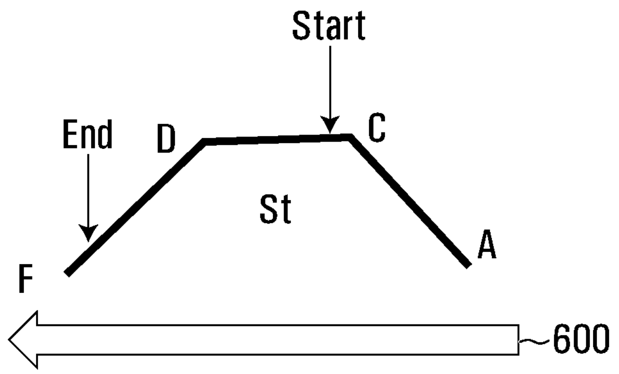
Figure 6C:
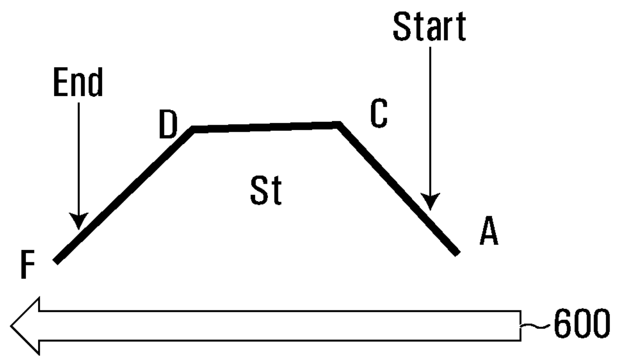

Referring now to FIGS. 6A to 6C, shown are schematics showing different possible timings for tack fusion. Tack fusion is welding that occurs in a vicinity of a stitch, for example while in the tack state 502. For each schematic, a large arrow 600 shows a direction travel of the welding torch T while welding over a stitch St, which is represented by three segments: segment A-C (i.e. enter region 401), segment C-D (i.e. tack region 402) and segment D-F (i.e. exit region 403). A start and an end of tack fusion are represented by labels "Start" and "End". In some implementations, the start and the end of tack fusion substantially correspond to the segment C-D (i.e. tack region 402) as shown in FIG. 6A. However, as shown in FIGS. 6B and 6C, other implementations are possible in which the start and the end of tack fusion can be varied to some extent. Different welders may prefer to start and end tack fusion at slightly different timings. The precise timings for tack fusion, and hence the precise timings state transitions as described above with reference to FIG. 5, are implementation specific.

As noted above, the welding states 501-505 differ from one another in terms of values for the welding variables which are defined for each welding state 501-505. Some example values for the welding variables are listed below. It is to be understood that these welding variables and their values are very specific and are provided merely as an example. The values can be different based on pipe size or different reasons.

| State | Wire feed speed | Positioner speed | Weave amplitude | Weave frequency | Peak current | Background current | Tail-out | Dwell |
|---|---|---|---|---|---|---|---|---|
| Uncertain 505 | 140 | 5.0 | 2.0 | 1.0 | 296 | 100 | 8 | 0.2 |
| Gap 504 | 150 | 6.0 | 3.0 | 1.0 | 296 | 100 | 8 | 0.2 |
| Enter 501 | 150 | 6.0 | 2.5 | 1.0 | 296 | 100 | 8 | 0.2 |
| Tack 502 | 160 | 6.5 | 3.50 | 1.2 | 295 | 100 | 6 | 0.1 |
| Exit 503 | 150 | 6.0 | 2.5 | 1.0 | 296 | 100 | 8 | 0.2 |

The chart above demonstrates how the values for the welding variables change based on changes in the welding state 501-505. For example, the weave amplitude is decreased during the enter state 501 and the exit state 503 and is increased in the tack state 502. In some implementations, some welding variables have values that remain constant such as the background current for example. However, each welding state 501-505 is unique in terms of its particular combination of values for the welding variables (i.e. no two welding states 501-505 are identical).

Example Image Capturing & Processing

As described above with reference to FIGS. 2 and 3, the camera C of the system 10 captures sequential images of the welding performed by the robotic welding system 100, and the processor 107 processes the sequential images to determine when a selected welding state is to change to a next welding state. Example implementation details will now be described below with reference to FIGS. 7 to 9. It is to be understood at the outset that the example implementation details described below are very specific and are provided merely as examples. Other implementations are possible and are within the scope of the disclosure.

There are many possibilities for the camera C. In some implementations, the camera C is an NIR (near infrared) camera. In specific implementations in which the camera C is an NIR camera with a resolution of 2048×2048, an 8-bit depth, and the processor 107 is provided with images wherein each pixel corresponds to an area of about 0.02 mm by 0.02 mm. The camera C can be of different types, and may have a different resolution, bit depth, lens, or other parameters in other implementations. In some implementations, the camera C is a stereo camera. In some implementations, the camera C includes multiple cameras operably coupled to the processor 107.

There are many ways that the camera C can be mounted within the system 10. The camera C can be mounted in any suitable location so long as it has a view of the welding performed by the welding torch T (i.e. region of interest is captured). In some implementations, the camera C is mounted on an underside of the torch arm. In other implementations, the camera C is mounted on top or on a side of the torch arm. Alternatively, the camera C can be mounted at any other suitable location (e.g., on the robotic welding system 100, on a separate fixed support, etc.) so long as it has a view of the welding performed by the welding torch T (i.e. region of interest is captured). Other implementations are possible.

Referring now to FIGS. 7A and 7B, shown are photographs of example frames captured by the system 10 of FIG. 2. These frames are captured by the camera C of the system 10. Note that the frames include a view of the welding performed by the welding torch T for the tack state 502 (FIG. 7A) and for the gap state 504 (FIG. 7B). The frames captured by the camera C are processed by the processor 107 of the system 10 as described below.

Referring now to FIG. 8, shown is a schematic showing pre-processing and processing of a set of frames to determine a probable welding state. The pre-processing and the processing of the set of frames is performed by the processor 107 of the system 10. In the illustrated example, a frame 801 has a resolution of 1240×1680 pixels, although other resolutions are possible and are within the scope of the disclosure. The frame 801 includes a region of interest to be welded, and other superfluous regions.

Whilst it may be possible to process the frame 801 in its entirety, including the superfluous regions, omitting the superfluous regions prior to processing can reduce an amount of computation by the processor 107. Also, a resizing operation can be performed to further reduce size of the frame 801. A final size can for example be 128×128 pixels, although other resolutions are possible and are within the scope of the disclosure. A reduced resolution can enable quicker computation and/or relax specifications for the processor 107 (e.g. reduced computational throughput) which could reduce cost while still enabling real-time processing (e.g. 20-30 fps processing).

In some implementations, once a smaller image 802 has been produced, the processor 107 analyzes the smaller image 802 to determine a probable welding state. In some implementations, rather than considering a single image at a time, the processor 107 considers a set of smaller images 802. The number of smaller image in the set is implementation-specific. In one specific example, the processor 107 analyzes 15 consecutive smaller images 802. However, other implementations are possible in which the processor 107 analyzes more or less smaller images 802. In some implementations, as an initialization step, the processor 107 uses an initial smaller image 802 and duplicates it 15 times rather than waiting for 15 consecutive smaller images. In other implementations, as an initialization step, the processor 107 waits for 15 consecutive smaller images 802.

In some implementations, the processor 107 calculates four outputs: a probability of the gap state 504, a probability of the enter state 501, a probability of the tack state 502, and a probability of the exit state 503. In some implementations, these four probabilities add up to a total probability of 100%. In some implementations, the processor 107 calculates the four outputs using a classifier 803. There are many possibilities for the classifier 803. In some implementations, the classifier 803 is a convolutional recurrent neural network, although other classifiers can be employed. In some implementations, the convolutional recurrent neural network is pre-trained as an encoder-decoder network, with the encoder being the same as a feature extraction part and the decoder being the exact same opposite with its weights being inverse of the encoder trained on a COCO (Common Objects in Context) dataset. In some implementations, the processor 107 determines that a given welding state is a probable welding state when it has been calculated to have a probability that exceeds a defined threshold, such as 90% or 95% for example.

There are many ways that the processor 107 can pre-process the frame 801 to produce the smaller image 802. An example will be described below. It is to be understood that this example is very specific and is provided merely as an example. Other ways to pre-process the frame 801 to produce the smaller image 802 are possible. For example, down sampling to a final size with interpolation techniques can be employed. However, the example described below may yield better results.

A sample camera input image is shown in FIG. 7A. First the best thresholding value is identified using a thresholding technique (e.g. histogram triangle algorithm). Next, the sample camera input image is thresholded using the obtained threshold value to create a binary mask. Next, some morphological assessments (e.g. dilation and erosion) are applied. Next, the largest connected component is identified and the smallest rectangle encompassing this largest connected component is extracted. This rectangle can have arbitrary size H×W. However, usually a smaller fixed size rectangle is used for the subsequent steps (for example 128×128). To maintain aspect ratio, we expand the rectangle appropriately (for example so H=W), and then we crop this region and down sample it to the final size (for example 128×128).

There are many possible thresholding techniques that can be used. Example thresholding techniques include Huang, Intermodes and Minimum, IsoData, Li, MaxEntropy, KittlerIllingworth, Moments, Yen, RenyiEntropy, Shanbhag, and Histogram Triangle Algorithm. Many of these thresholding techniques have been tested, and they work to some extent, but initial experiments show that the histogram triangle algorithm gives best results. As such, the histogram triangle algorithm is described in further detail below. However, it is to be understood that the disclosure is not limited to the histogram triangle algorithm.

Referring now to FIG. 9, shown is a graph 900 showing application of a histogram triangle algorithm for the pre-processing. As illustrated, pixel brightness of the frame are represented in a histogram, and a straight line is drawn between a peak of the histogram and a farthest end of the histogram. A threshold b is a point of maximum distanced between the line and the histogram.

Once the threshold b has been calculated, the threshold b is applied to the image to determine the largest connected component by assessing one or more clusters of pixels that meet the threshold b. Once the largest connected component is determined, the image is cropped to produce a smaller image that focuses on the largest connected component. The cropping involves finding a rectangle that is large enough to contain the largest connected component, but also small enough to suitably focus on the largest connected component and thereby effectively reduce size. In some implementations, the smaller image is further reduced in size by a resizing operation as described above. It is noted that the final size is not necessarily fixed, but could vary depending on network architecture and how it accepts it, type of classifier, and/or how much computation we have. In some implementations, an aspect ratio is maintained as described above.

Method for Automatic Welding

Figure 10:
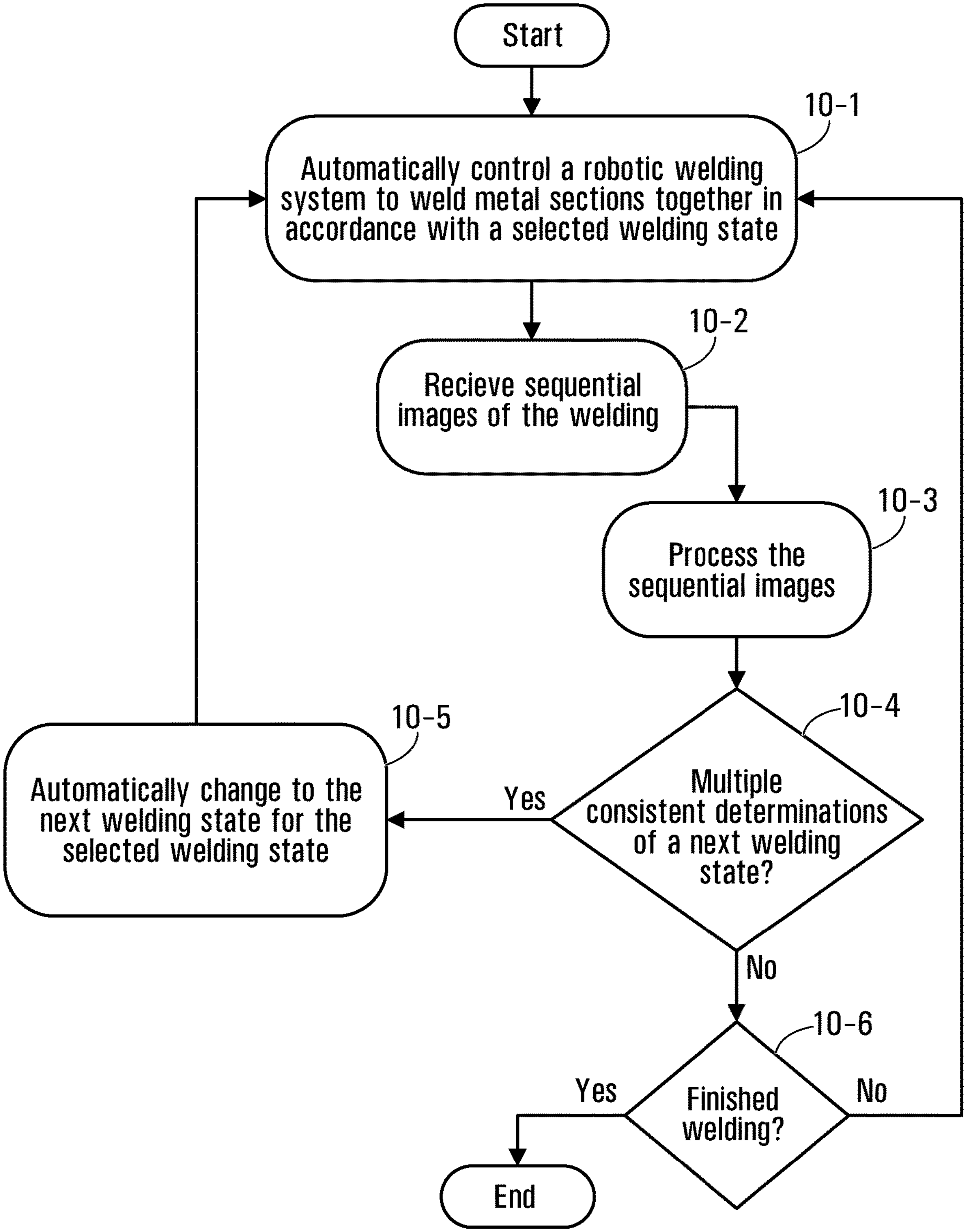
FIG. 10 is a flowchart of a method for automatically controlling a robotic welding system.

Referring now to FIG. 10, shown is a flowchart of a method for automatically controlling a robotic welding system. This method can be implemented by control circuitry, for example by a combination of the controller 103 and the processor 107 of the system 10 shown in FIG. 3. More generally, this method can be implemented by any appropriate control circuitry, whether it be a combination of components or a single component.

At step 10-1, the control circuitry automatically controls a robotic welding system to weld metal sections together in accordance with a selected welding state of a plurality of possible welding states. Notably, the possible welding states differ from one another in terms of values of welding variables which are defined for each possible welding state.

At step 10-2, the control circuitry receives sequential images of the welding. The sequential images can be received from a camera as similarly described above.

At step 10-3, the control circuitry processes the sequential images to determine when the selected welding state is to change to a next welding state of the possible welding states. In accordance with an embodiment of the disclosure, this determination is based on the selected welding state and whether there are multiple consistent determinations of the next welding state, as similarly described above. By considering multiple consistent determinations of the next welding state, there can be a high probability that the next welding state is correct. This can avoid a situation in which a wrong welding state is selected.

If at step 10-4 the control circuitry determines that there are multiple consistent determinations of the next welding state, then at step 10-5 the control circuitry automatically changes to the next welding state for the selected welding state to effect a change in how the welding is performed by the robotic welding system. Otherwise, the welding continues without changing the selected welding state, assuming of course that the welding is not finished.

If at step 10-6 the control circuitry determines that the welding is finished, then the method ends. For example, upon a user pressing a stop button, a controller can send a stop signal to software.

In some implementations, the metal sections have been stitched together with stitches in preparation for the welding, and the next welding state is determined based on stitching between the metal sections in a region being welded, as similarly described above.

Whilst the method of FIG. 10 includes operations that may involve a combination of a controller and a processor (e.g. the controller 103 and the processor 107 of the system 10 shown in FIG. 3), another method is described below that focuses on operations by a processor or other control circuitry, for example the processor 107 of the system 10 shown in FIG. 3.

Figure 11:
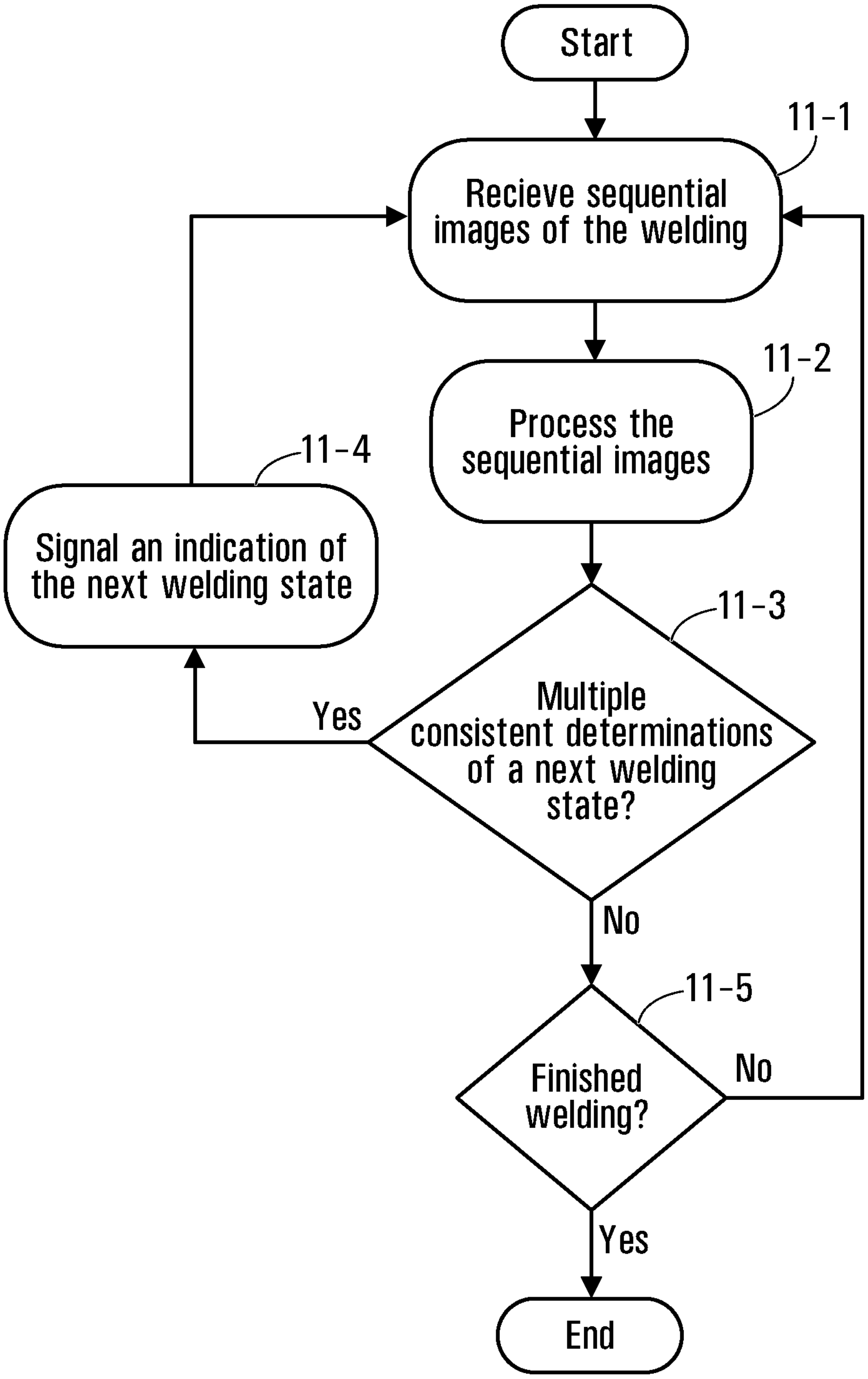
FIG. 11 is a flowchart of another method for automatically controlling a robotic welding system.

Referring now to FIG. 11, shown is a flowchart of another method for automatically controlling a robotic welding system. This method can be implemented by control circuitry, for example by the processor 107 of the system 10 shown in FIG. 3. More generally, this method can be implemented by any appropriate control circuitry, whether it be a combination of components or a single component.

At step 11-1, the control circuitry receives sequential images of metal sections being welded together by a robotic welding system, in accordance with a selected welding state of a plurality of possible welding states. Notably, the possible welding states differ from one another in terms of values of welding variables which are defined for each possible welding state.

At step 11-2, the control circuitry processes the sequential images to determine when the selected welding state is to change to a next welding state of the possible welding states. In accordance with an embodiment of the disclosure, as shown at step 11-3, this determination is based on the selected welding state and whether there are multiple consistent determinations of the next welding state, as similarly described above. By considering multiple consistent determinations of the next welding state, there can be a high probability that the next welding state is correct. This can avoid a situation in which a wrong welding state is selected.

At step 11-4, upon determining that the selected welding state is to change to the next welding state, the control circuitry signals an indication of the next welding state to the robotic welding system or to a controller of the robotic welding system. This is performed to effect a change in how the welding is performed by the robotic welding system.

If at step 11-5 the control circuitry determines that the welding is finished, then the method ends. For example, upon a user pressing a stop button, a controller can send a stop signal to software.

According to another embodiment of the disclosure, there is provided a non-transitory computer readable medium having recorded thereon statements and instructions that, when executed by control circuitry (e.g. the processor 107 of the system 10 shown in FIG. 3), implement a method as described herein, for example the method described above with reference to FIG. 11. There are many possibilities for the non-transitory computer readable medium. Some possibilities include an SSD (Solid State Drive), a hard disk drive, a CD (Compact Disc), a DVD (Digital Video Disc), a BD (Blu-ray Disc), a memory stick, or any appropriate combination thereof.

Numerous modifications and variations of the present disclosure are possible in light of the above teachings. It is therefore to be understood that within the scope of the appended claims, the disclosure may be practised otherwise than as specifically described herein.

We claim:

1. A system comprising:

a robotic welding system configured to weld metal sections together in accordance with a plurality of welding variables;

a controller configured to automatically control the robotic welding system in accordance with a selected welding state of a plurality of possible welding states, wherein the possible welding states differ from one another in terms of values of the welding variables which are defined for each possible welding state;

a camera positioned to capture sequential images of the welding performed by the robotic welding system;

a processor configured to process the sequential images to determine when the selected welding state is to change to a next welding state of the possible welding states based on the selected welding state and multiple consistent determinations of the next welding state, and to signal that change to the controller to effect a change in how the welding is performed by the robotic welding system, wherein the processor is configured to process the sequential images to determine when the selected welding state is to change to the next welding state by:

determining a probable welding state of the plurality of possible welding states for each of a plurality of sets of images of the sequential images;

upon determining a same welding state for the probable welding state for at least a threshold number of the plurality of sets of images, if the probable welding state is not equal to a current welding state, the processor determines that the current welding state is to change to the probable welding state as the next welding state.

2. The system of claim 1, wherein the metal sections have been stitched together with stitches in preparation for the welding, and the processor is configured to determine the next welding state based on stitching between the metal sections in a region being welded.

3. The system of claim 2, wherein the metal sections comprise pipe sections that have been stitched together with the stitches to form a pipe string.

4. The system of claim 3, further comprising:

a positioner for rotating the pipe string in relation to the robotic welding system such that the robotic welding system welds along a seam between the pipe sections.

5. The system of claim 1, wherein the possible welding states comprise four welding states.

6. The system of claim 5, wherein the four welding states comprise:

a gap state for welding the metal sections together in a region having a gap with no stitch;

an enter state for welding the metal sections together in a region that having a gap leading to a stitch;

a tack state for welding the metal sections together in a region having a stitch and no gap; and an exit state for welding the metal sections together in a region having a stitch leading to a gap.

7. The system of claim 6, wherein:

for a state transition from the gap state to the enter state as the next welding state, the multiple consistent determinations of the enter state comprises $C_{gn}$ consecutive calculations of the enter state having at least $P_{gn}$ probability for $C_{gn}$ consecutive images of the sequential images;

for a state transition from the enter state to the tack state as the next welding state, the multiple consistent determinations of the tack state comprises $C_{nt}$ consecutive calculations of the tack state having at least $P_{nt}$ probability for $C_{nt}$ consecutive images of the sequential images;

for a state transition from the tack state to the exit state as the next welding state, the multiple consistent determinations of the exit state comprises $C_{tx}$ consecutive calculations of the exit state having at least $P_{tx}$ probability for $C_{tx}$ consecutive images of the sequential images; and for a state transition from the exit state to the gap state as the next welding state, the multiple consistent determinations of the gap state comprises $C_{xg}$ consecutive calculations of the gap state having at least $P_{xg}$ probability for $C_{xg}$ consecutive images of the sequential images;

wherein each aforementioned probability P is a defined number such that $0<P\leq 1$ and each aforementioned count C is a defined whole number such that $C>0$.

8. The system of claim 7, wherein:

for a state transition from the gap state to the tack state as the next welding state, the multiple consistent determinations of the tack state comprises $C_{gt}$ consecutive calculations of the tack state having at least $P_{gt}$ probability for $C_{gt}$ consecutive images of the sequential images;

for a state transition from the enter state to the exit state as the next welding state, the multiple consistent determinations of the exit state comprises $C_{nx}$ consecutive calculations of the exit state having at least $P_{nx}$ probability for $C_{nx}$ consecutive images of the sequential images;

for a state transition from the enter state to the gap state as the next welding state, the multiple consistent determinations of the gap state comprises $C_{ng}$ consecutive calculations of the gap state having at least $P_{ng}$ probability for $C_{ng}$ consecutive images of the sequential images;

for a state transition from the tack state to the gap state as the next welding state, the multiple consistent determinations of the gap state comprises $C_{tg}$ consecutive calculations of the gap state having at least $P_{tg}$ probability for $C_{tg}$ consecutive images of the sequential images;

for a state transition from the tack state to the enter state as the next welding state, the multiple consistent determinations of the enter state comprises $C_{tn}$ consecutive calculations of the enter state having at least $P_{tn}$ probability for $C_{tn}$ consecutive images of the sequential images;

for a state transition from the exit state to the tack state as the next welding state, the multiple consistent determinations of the tack state comprises $C_{xt}$ consecutive calculations of the tack state having at least $P_{xt}$ probability for $C_{xt}$ consecutive images of the sequential images; and for a state transition from the exit state to the enter state as the next welding state, the multiple consistent determinations of the enter state comprises $C_{xn}$ consecutive calculations of the enter state having at least $P_{xn}$ probability for $C_{xn}$ consecutive images of the sequential images;

wherein each of probabilities $P_{gt}$, $P_{nx}$, $P_{ng}$, $P_{tg}$, $P_{tn}$ and $P_{xt}$ is a defined number such that $0<P\leq 1$ and each of counts $C_{gt}$, $C_{nx}$, $C_{ng}$, $C_{tg}$, $C_{tn}$ and $C_{xt}$ is a defined whole number such that $C>0$.

9. The system of claim 1, wherein:

the controller begins in an initial uncertain state before the processor determines a first welding state; and the processor is configured to process the sequential images to determine when the initial uncertain state is to change to a first welding state of the possible welding states based on multiple consistent determinations of the first welding state, and to signal that change to the controller.

10. The system of claim 9, wherein:

for a state transition from the initial uncertain state to a gap state as the first welding state, the multiple consistent determinations of the gap state comprises $C_{ug}$ consecutive calculations of the gap state having at least $P_{ug}$ probability for $C_{ug}$ consecutive images of the sequential images;

for a state transition from the initial uncertain state to an enter state as the first welding state, the multiple consistent determinations of the enter state comprises $C_{un}$ consecutive calculations of the enter state having at least $P_{un}$ probability for $C_{un}$ consecutive images of the sequential images;

for a state transition from the initial uncertain state to a tack state as the first welding state, the multiple consistent determinations of the tack state comprises $C_{ut}$ consecutive calculations of the tack state having at least $P_{ut}$ probability for $C_{ut}$ consecutive images of the sequential images; and for a state transition from the initial uncertain state to an exit state as the first welding state, the multiple consistent determinations of the exit state comprises $C_{ux}$ consecutive calculations of the exit state having at least $P_{ux}$ probability for $C_{ux}$ consecutive images of the sequential images;

wherein each of probabilities $P_{ug}$, $P_{un}$, $P_{ut}$ and $P_{ux}$ is a defined number such that $0<P\leq 1$ and each of counts $C_{ug}$, $C_{un}$, $C_{ut}$ and $C_{ux}$ is a defined whole number such that $C>0$.

11. The system of claim 1, wherein the processor is configured to process the sequential images by:

for each image of the sequential images, pre-process the image to produce a smaller image, and process the smaller image with a classifier to determine a probable welding state for the next welding state.

12. The system of claim 11, wherein the classifier comprises a convolutional recurrent neural network.

13. The system of claim 11, wherein the processor is configured to pre-process each image by applying a thresholding technique.

14. The system of claim 13, wherein the thresholding technique comprises a histogram triangle algorithm.

15. The system of claim 1, wherein the controller comprises a PLC (programmable logic controller) and the processor comprises a GPU (graphics processing unit).

16. A system comprising:

a robotic welding system configured to weld metal sections together in accordance with a plurality of welding variables;

a controller configured to automatically control the robotic welding system in accordance with a selected welding state of a plurality of possible welding states, wherein the possible welding states differ from one another in terms of values of the welding variables which are defined for each possible welding state;

a camera positioned to capture sequential images of the welding performed by the robotic welding system; and a processor configured to process the sequential images to determine when the selected welding state is to change to a next welding state of the possible welding states based on the selected welding state and multiple consistent determinations of the next welding state, and to signal that change to the controller to effect a change in how the welding is performed by the robotic welding system, wherein the processor is configured to process the sequential images to determine when the selected welding state is to change to the next welding state by:

determining a probable welding state of the plurality of possible welding states based on a set of at least one image of the sequential images;

repeating the determining of the probable welding state for subsequent sets of at least one image of the sequential images;

upon determining a same welding state for the probable welding state a defined number of consecutive times, if the probable welding state is not equal to a current welding state, the processor determines that the current welding state is to change to the probable welding state as the next welding state.

17. The system of claim 16, wherein each set of at least one image comprises fifteen consecutive images.

18. The system of claim 16, wherein:

for each possible welding state, a plurality of possible state transitions are defined, such that each possible state transition has a target welding state of the possible welding states;

for each possible state transition, a probability is defined as a threshold for determining the target welding state as the probable welding state; and for each possible state transition, a number of consecutive times to determine the target welding state as the probable welding state is defined as a threshold for determining the target welding state as the next welding state.

19. The system of claim 16, wherein:

for each set of at least one image, a probable welding state is determined only if a calculated probability meets or exceeds a minimum probability.

20. The system of claim 16, wherein the defined number of consecutive times is five consecutive times.

21. A computer-implemented method comprising:

automatically controlling a robotic welding system to weld metal sections together in accordance with a selected welding state of a plurality of possible welding states, wherein the possible welding states differ from one another in terms of values of welding variables which are defined for each possible welding state;

receiving sequential images of the welding;

processing the sequential images to determine when the selected welding state is to change to a next welding state of the possible welding states based on the selected welding state and multiple consistent determinations of the next welding state; and when the selected welding state is to change to the next welding state, automatically changing to the next welding state for the selected welding state to effect a change in how the welding is performed by the robotic welding system, wherein determining when the selected welding state is to change to the next welding state comprises:

determining a probable welding state of the plurality of possible welding states for each of a plurality of sets of images of the sequential images;

upon determining a same welding state for the probable welding state for at least a threshold number of the plurality of sets of images, if the probable welding state is not equal to a current welding state, determining that the current welding state is to change to the probable welding state as the next welding state.

22. The method of claim 21, wherein:

the metal sections have been stitched together with stitches in preparation for the welding, and the next welding state is determined based on stitching between the metal sections in a region being welded.

23. A computer-implemented method comprising:

automatically controlling a robotic welding system to weld metal sections together in accordance with a selected welding state of a plurality of possible welding states, wherein the possible welding states differ from one another in terms of values of welding variables which are defined for each possible welding state;

receiving sequential images of the welding;

processing the sequential images to determine when the selected welding state is to change to a next welding state of the possible welding states based on the selected welding state and multiple consistent determinations of the next welding state; and when the selected welding state is to change to the next welding state, automatically changing to the next welding state for the selected welding state to effect a change in how the welding is performed by the robotic welding system, wherein determining when the selected welding state is to change to the next welding state comprises:

determining a probable welding state of the plurality of possible welding states based on a set of at least one image of the sequential images;

repeating the determining of the probable welding state for subsequent sets of at least one image of the sequential images;

upon determining a same welding state for the probable welding state a defined number of consecutive times, if the probable welding state is not equal to a current welding state, determining that the current welding state is to change to the probable welding state as the next welding state.

24. The method of claim 23, wherein the defined number of consecutive times is five consecutive times.

25. A non-transitory computer readable medium having recorded thereon statements and instructions that, when executed by control circuitry, implement a method comprising:

receiving sequential images of metal sections being welded together by a robotic welding system in accordance with a selected welding state of a plurality of possible welding states, wherein the possible welding states differ from one another in terms of values of welding variables which are defined for each possible welding state;

processing the sequential images to determine when the selected welding state is to change to a next welding state based on the selected welding state and multiple consistent determinations of the next welding state; and upon determining that the selected welding state is to change to the next welding state, signaling an indication of the next welding state to the robotic welding system or to a controller of the robotic welding system, wherein determining when the selected welding state is to change to the next welding state comprises:

determining a probable welding state of the plurality of possible welding states for each of a plurality of sets of images of the sequential images;

upon determining a same welding state for the probable welding state for at least a threshold number of the plurality of sets of images, if the probable welding state is not equal to a current welding state, determining that the current welding state is to change to the probable welding state as the next welding state.

* * * * *